May 29, 1928.
R. E. TERHUNE
1,671,795
GAS TESTING DEVICE
Filed Aug. 27, 1925
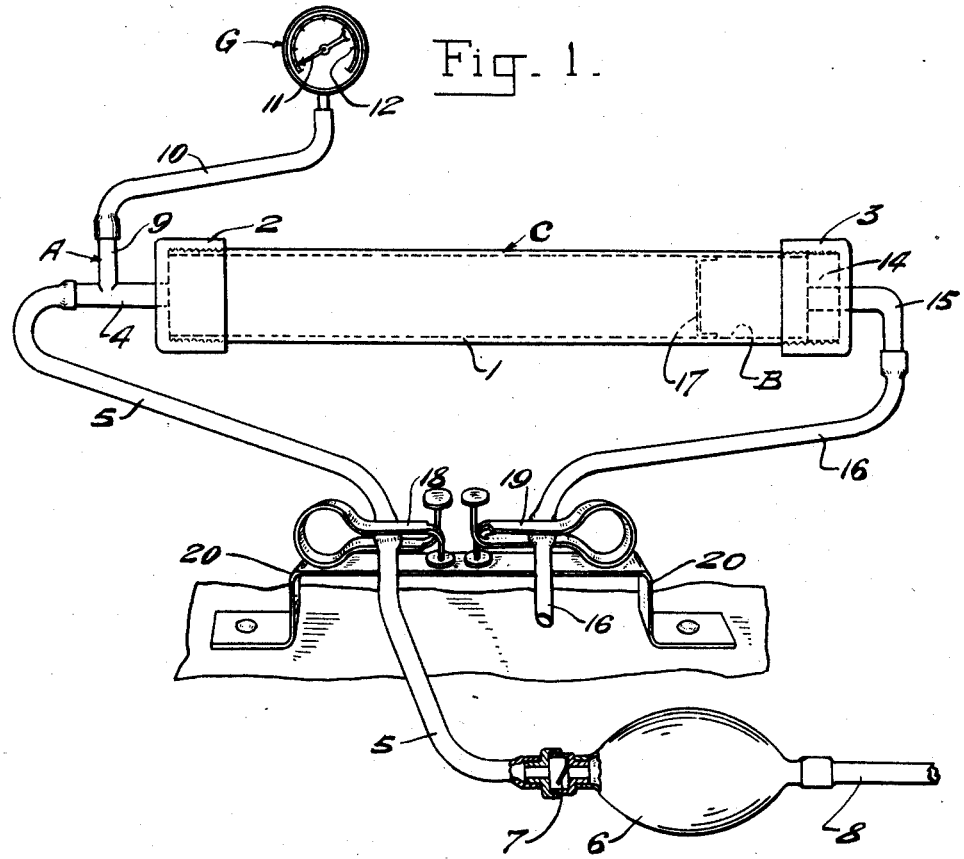
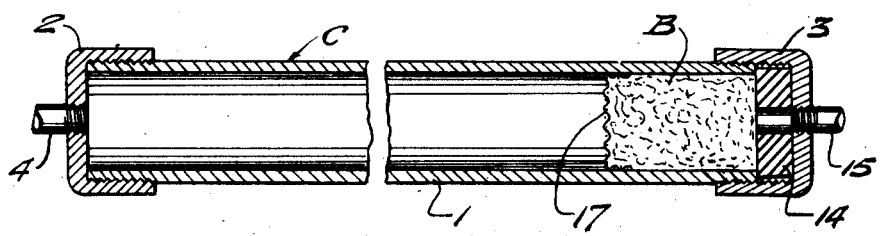
Inventor
Royal E. Terhune
By Watson E. Coleman
Attorney Patented May 29, 1928.

1,671,795

UNITED STATES PATENT OFFICE.

ROYAL E. TERHUNE, OF PATERSON, NEW JERSEY.

GAS-TESTING DEVICE.

Application filed August 27, 1925. Serial No. 52,878.

This invention relates to certain improvements in gas testing devices and has relation more particularly to a device of this kind of a portable type, it being an object of the invention to provide a tester which is free of liquids and which operates in a manner to provide quick and easy determinations.

Another object of the invention is to provide a device of this kind which is particularly adapted for use to determine the percentage of a constituent, such as carbon dioxide, carbon monoxide, sulphur dioxide, oxygen, chlorine and other gases, and wherein such constituent is absorbed by suitable material within a container resulting in a partial vacuum within the container which is transmitted to a suitable vacuum gauge properly calibrated to indicate the percentage of the constituent absorbed.

The invention consists in the details of construction and in the combination and arrangement of the several parts of my improved gas testing device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a diagrammatic view with portions in section illustrating a testing device constructed in accordance with an embodiment of my invention;

Figure 2 is a longitudinal sectional view taken through the container as illustrated in Figure 1 with associated parts in elevation.

As disclosed in the accompanying drawings, C denotes an elongated container the interior of which constitutes what is termed the absorption chamber. The container C, as herein disclosed, is an elongated tubular member 1 of requisite dimensions and which has its opposite ends closed by the removable caps 2 and 3, said member 1 and caps 2 and 3 being of brass or other metal.

In communication with the container C through the cap 2 is an end portion of a head 4 of a T-connector A, the opposite end portion of said head 4 having suitably coupled thereto flexible tubing 5 of any desired length and leading from an aspirator bulb 6. This bulb 6 is of rubber and of hand size and contains a check valve 7. This bulb 6 also has in communication therewith tubing 8 adapted to communicate with the source of the gas to be tested.

The stem 9 of the connector A has coupled thereto the tubing 10 which is also properly coupled to the gauge G of a vacuum type and which comprises the index or pointer 11 coacting with the calibrations 12 to give the required reading. The gauge G in itself forms no part of the present invention as the same may be one of the many types now on the market, it only being required that the calibrations read the percentage in connection with the constituent or gas to be tested.

The cap 3 has arranged therein a rubber plug 14 and which seats tightly against the adjacent end of the member 1 to assure a gas-tight connection. Disposed through the cap 3 and the applied plug 14 is an end portion of an L-connector 15 the opposite end portion of said connector having suitably coupled thereto an end portion of an elongated tubing 16, said tubing 16 constituting a carry-off conduit. Arranged within the member 1 at a desired distance inwardly of the cap 3 is a metal screen 17 intersecting the bore or chamber of such member, and placed within said chamber between the screen 17 and the cap 3 or more particularly the plug 14 is an absorbent B, said absorbent being in accordance with the character of the gas to be tested or determined and of a dry character. At this time I wish to state that I do not wish to be understood as limiting myself to any particular kind of absorbent.

Coacting with the tubing 5 is a pinch cock 18 and coacting with the tubing 16 is the pinch cock 19, both of said cocks 18 and 19 being carried by the shutoff bracket 20.

The desired absorbent B is placed within the member 1 with the cap 3 removed and said member 1 in substantially a vertical position. After said applied absorbent has been substantially leveled with the adjacent end of the member 1, the cap 3 is replaced until a tight connection is effected.

In making a test, the tubing 8 is connected to the source of supply and the cocks 18 and 19 being held open by a digit of the left hand, preferably the thumb. This opening of the cocks is readily permitted in view of the fact that the operating ends of the cocks are in sufficient proximity to enable the thumb to engage both of them when the other digits or fingers are engaged against the under side of the bracket 20. The aspirator bulb 6 is then squeezed or operated with the right hand regularly for a few minutes to cause the gas to be drawn from its supply and forced completely through the member 1, it being emitted through the tubing 16. When it is believed that a good sample of the gas is within the member 1 the pinch cocks are released to close the flow through both of the tubings 5 and 16. The index or pointer of the gauge G will immediately begin to move and indicate the percentage of the desired constituent of the gas due to the fact that such constituent, such as carbon dioxide or the like, will be absorbed by the absorption medium B and by so doing reducing the volume and pressure within the member 1 resulting in the creation of a partial vacuum. This partial vacuum in turn is transmitted to the gauge G through the tubing 10 causing the index or pointer of the gauge to actuate to indicate the percent of the constituent absorbed by the absorbent B. The desired determination is completed when the index or pointer of the gauge comes to a rest or stop which is generally accomplished in about one and one-half minutes time but this, of course, is variable due to the condition of the absorbent B and the gas being tested. After the reading has been taken of the gauge, the cocks 18 and 19 are momentarily open whereupon the index or pointer of the gauge will return to its zero position and the equipment is ready for another operation or determination.

From the foregoing description it is thought to be obvious that a gas testing device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A testing device of the class described, comprising a tubular member, removable caps at each end of said tubular member, a flexible conduit having connection with one of said caps for delivering within said tubular member at one end thereof, said conduit leading from a source of supply, an aspirator coacting with said conduit, a vacuum gauge in communication with said conduit adjacent the cap, a second flexible conduit connected with the other cap and having communication with the tubular member at the opposite end thereof, an absorbent of a dry character within said tubular member at one end thereof, means engageable with each of the flexible conduits normally compressing the same to close flow therethrough, the means normally compressing one of the conduits being positioned immediately adjacent to the means for closing the second conduit to permit both of the means to release the conduits upon operation by a single digit of the hand.

2. A testing device of the class described, comprising a tubular member, removable caps at each end of said tubular member, a flexible conduit having connection with one of said caps for delivering within said tubular member at one end thereof, said conduit leading from a source of supply, an aspirator coacting with said conduit, a vacuum gauge in communication with said conduit adjacent the cap, a second flexible conduit connected with the other cap and having communication with the tubular member at the opposite end thereof, a metal screen member arranged within one end of the tubular member, an absorbent of a dry character compressed within said metal screen member, means engageable with each of the flexible conduits normally compressing the same to close flow therethrough, the means normally compressing one of the conduits being positioned immediately adjacent to the means for closing the second conduit to permit both of the means to release the conduits upon operation by a single digit of the hand.

In testimony whereof I hereunto affix my signature.

ROYAL E. TERHUNE.